United States Patent [19]

Peterson et al.

[11] 3,825,125

[45] July 23, 1974

[54] FILTER AND GUIDE APPARATUS

[75] Inventors: C. Lynn Peterson, Salt Lake City; Jesard Morrise, Roy, both of Utah

[73] Assignee: Peterson Filters and Engineering Company, Salt Lake City, Utah

[22] Filed: May 24, 1972

[21] Appl. No.: 256,281

[52] U.S. Cl............................... 210/401, 74/241
[51] Int. Cl............................................ B01d 33/14
[58] Field of Search...................... 74/241; 210/401; 285/26-34; 198/137

[56] References Cited
UNITED STATES PATENTS

| 664,341 | 12/1900 | Trommlitz | 285/34 X |
| 3,077,990 | 2/1963 | Peterson | 210/401 |
| 3,288,298 | 11/1966 | Daugherry et al. | 210/401 |
| 3,356,224 | 12/1967 | Orr | 210/401 |
| 3,503,517 | 3/1970 | Barnebl et al. | 210/401 |
| 3,598,244 | 8/1971 | Babcock, Jr. | 210/401 |

FOREIGN PATENTS OR APPLICATIONS

| 934,129 | 8/1963 | Great Britain | 210/401 |

Primary Examiner—Theodore A. Granger
Attorney, Agent, or Firm—Bruce G. Klass, Esq.

[57] ABSTRACT

There is herein disclosed a movable cloth filter belt construction for filter apparatus comprising a guide element having a bifurcated cloth gripping portion within which a cloth filter is fastened and a roller engaging portion having an inclined roller engaging surface facing the cloth filter. Flanged roller apparatus engages the inclined surface on the guide element to transversely alignably guide the filter belt during movement and is associated with resilient biasing spring means including detent-type release means which permits disassociation of the spring means and the roller apparatus under high stress conditions.

17 Claims, 10 Drawing Figures

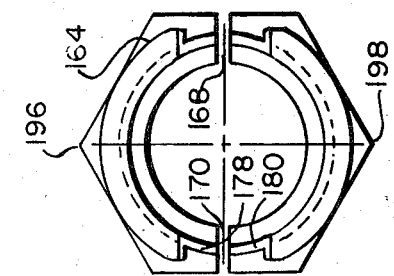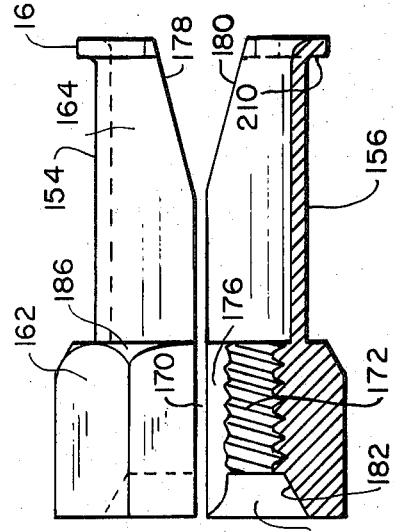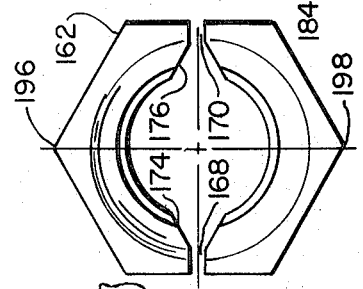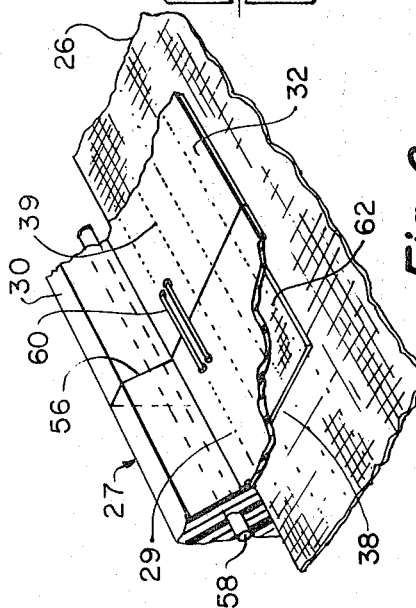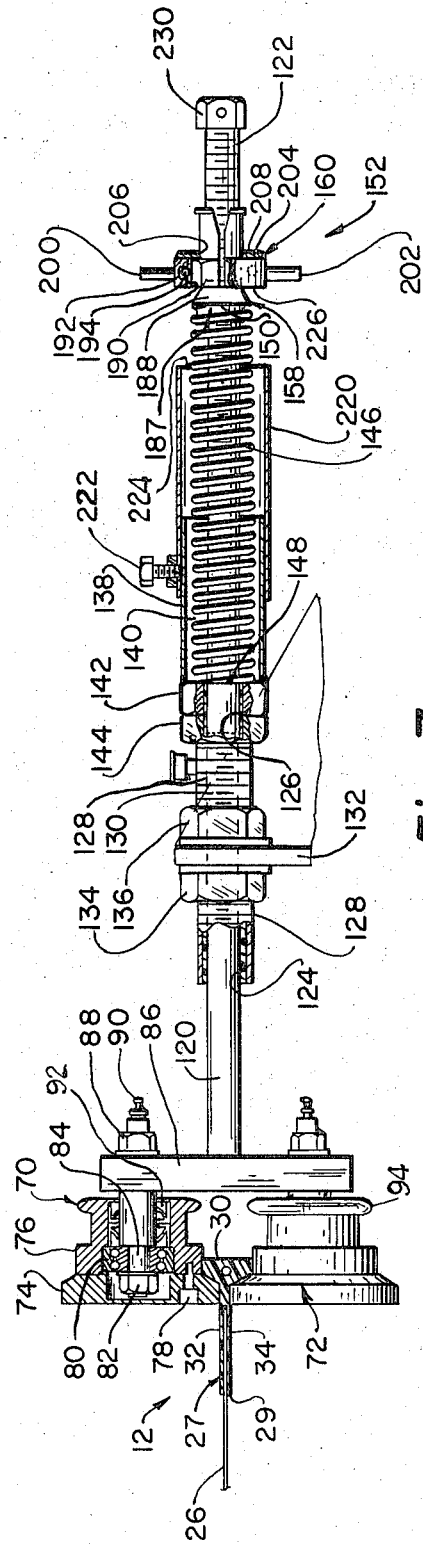

3,825,125

FILTER AND GUIDE APPARATUS

BACKGROUND OF INVENTION

The invention relates generally to filtering apparatus of the type employing an endless filter belt and, more particularly, to an improved filter belt alignment apparatus. One of the major problems with belt type filtering apparatus is to keep the filter belt aligned as it moves around drums and rolls of the filtering apparatus. Prior art belt alignment apparatus is illustrated by U.S. Pat. Nos. 3,077,990 and 3,503,517.

DRAWING

FIG. 6 is a perspective view of a portion of the filter belt of FIG. 2;

FIG. 7 is an enlarged side elevational view, partly in section, of the alignment apparatus shown in FIG. 2;

FIG. 8 is an enlarged side elevational view, partly in section, of one of the elements of the alignment apparatus of FIG. 7;

FIG. 9 is an end view of the element shown in FIG. 8; and

FIG. 10 is another end view of the element shown in FIG. 9.

IN GENERAL

Figure 1:
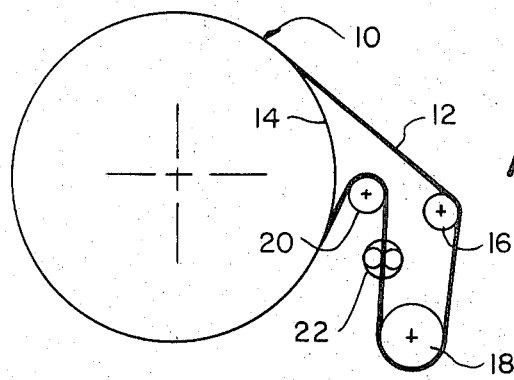
FIG. 1 is a schematic side elevational view of a rotary drum vacuum type filter unit employing the present invention.
Figure 2:
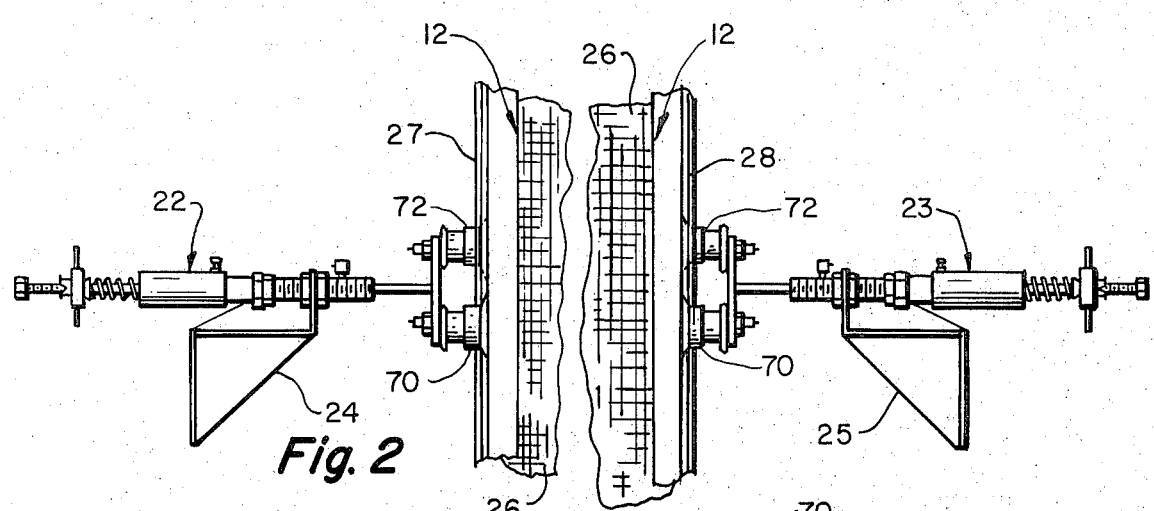
FIG. 2 is a partial plan view of an endless filter belt and belt alignment apparatus embodying the inventive concepts.

Referring now to FIGS. 1 and 2, a rotary drum vacuum type filter unit 10 is shown to comprise an endless traveling filter belt 12 extending around a vacuum drum 14, a discharge roll 16, a wash roll 18, and a return roll 20. A pair of opposite aligned belt tracking assemblies 22, 23 are suitably mounted on support standards 24, 25. It is to be understood that the assemblies 22, 23, 24, 25 are identically constructed. The filter unit 10 may be of any conventional design as illustrated, for example, in prior U.S. Pat. Nos. 3,077,990 and 3,503,517. In addition, it will be understood that the inventive concepts may be applicable to other types of filter units which utilize endless belts such as shown in U.S. Pat. No. 3,348,682.

THE FILTER BELT MEDIUM

Figure 3:
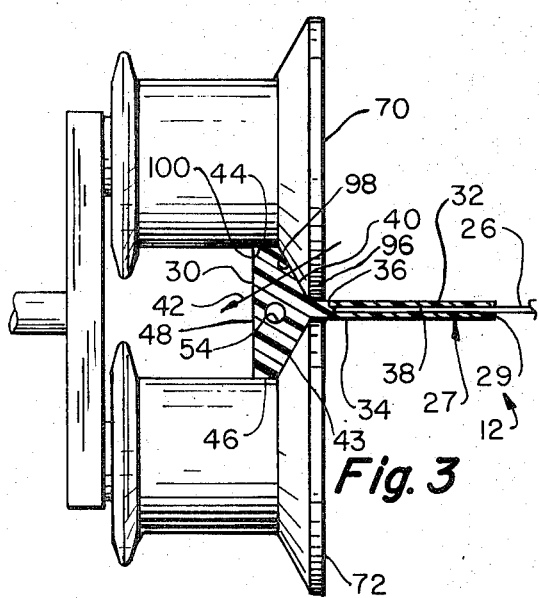
FIG. 3 is an enlarged side elevational view of a portion of a presently preferred form of filter belt and alignment apparatus therefor.
Figure 4:
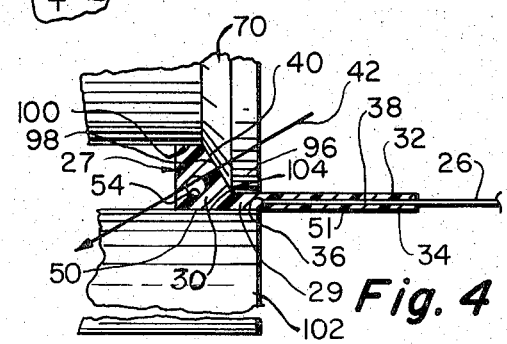
FIG. 4 is an enlarged side elevational view of a portion of an alternative form of filter belt and alignment apparatus therefor.
Figure 5:
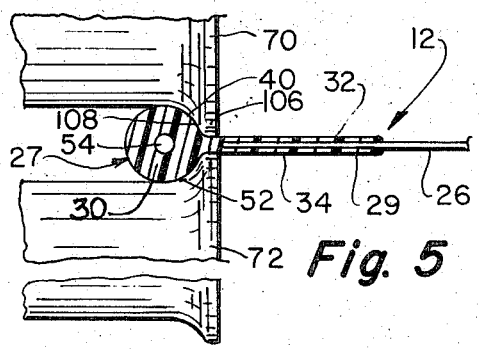
FIG. 5 is an enlarged side elevational view of a portion of another alternative form of filter belt and alignment apparatus therefor.

Referring now to FIGS. 2-5, the filter belt 12 comprises a conventional endless length of flexible resilient material 26, such as synthetic cloth, having guide elements 27, 28 attached to the edges and extending continuously therearound. The continuous edge guide elements may be provided by one or more extruded plastic(ethylene propylene diene monomer plastic material being suitable)sections having a unique cross-sectional configuration. Referring now to FIGS. 3-5, each guide element comprises a cloth attachment portion 29 and a guide roller engaging portion 30. The cloth attachment portion 29 comprises relatively wide upper and lower flange or flat portions 32, 34 separated by a substantially equally wide cloth slot 36 in which a substantial width of the edge portion 38 of the filter cloth 26 is fixedly retained as by four rows of stitching with heavy duty nylon thread 39 or the like, as shown in FIG. 6. The thickness of the slot, as measured between the flange portions, is approximately equal to the thickness of the filter cloth whereby a close fit and maximum support for the edge of the cloth are obtained. The thickness of the flange portions is such as to provide sufficient strength without loss of flexibility or impairment of close fitting engagement of the cloth with the drum and rolls. The roller engaging portion 30 comprises at least one generally inclined abutment surface 40 generally facing toward the center of the filtering cloth and having at least a central area of roller engagement along a line extending generally at right angles relative to the abutment surface 40 as indicated by center line 42. In the embodiment of FIG. 3, flat equal length upper and lower inclined abutment surfaces 40, 43 are provided which intersect flat upper and lower parallel roller engaging side surfaces 44, 46. A flat end surface 48 extends transversely to the flange portions. In the embodiment of FIG. 4, only one flat upper abutment surface 40 is provided and the lower side surface 50 of the roller engaging portion is provided by a continuation of the lower flat side surface 51 of the flange portion. In the embodiment of FIG. 5, the roller engaging portion is of generally cylindrical peripheral configuration with upper and lower curved abutment surfaces 40, 52.

Each of the roller engaging portions includes a centrally located passage 54 which may be used at a joint 56, FIG. 6, to connect abutting ends of the guide element by insertion of a rod member 58. The joint between the abutting ends is further secured by cross stitching with heavy duty nylon thread as at 60 and one or more layers of heavy duty cloth material 62 placed across the joint between the guide element flange and the edge of the cloth.

FILTER GUIDE ROLLERS

Referring now to FIG. 7, each of the tracking assemblies comprises a pair of guide roller units 70, 72 with one unit 70 engaging the top of guide element and the other unit 72 engaging the bottom of the guide element. The inside portion of each roller unit adjacent the guide elements are provided with a peripheral configuration which generally corresponds to the peripheral configuration of the engaged portion of the guide element. In general, each roller comprises a flanged outer hub 74 fixed to an inner hub 76 by suitable fastening means 78 and both are rotatably supported by a wide double row ball bearing 80 held by a nut 82 on a shaft 84 fixed to a support plate 86 by a nut 88 including a lubrication fitting 90. A double axle seal 92 and a flange 94 are provided to keep the filtered material away from the bearing. As shown in FIGS. 3-5, the outer hubs of each roller are provided with a flange 96 having an annular abutment surface 98 facing generally away from the filter cloth and correspondingly inclined to the guide element abutment surface 40 for abutting guiding engagement therewith. In addition, each roller is provided with a generally cylindrical abutment surface 100, which intersects the inclined abutment surface 98, for abutting guiding engagement with guide element abutment surfaces 44, 46. In the embodiment of FIG. 4, the lower roller 102 is provided with only a flat cylindrical surface 104 to receive the flat abutment surface 50 of the guide element. In the embodiment of FIG. 5, each roller is provided with a flange 106 having an annular circularly curved abutment surface 108 facing away from the filter cloth and correspondingly inclined to the guide element abutment surface. While the circularly curved embodiment of FIG. 5 has certain advantages in terms of ease of tracking of the belt, it also has certain disadvantages in terms of gripping force and wear.

RESILIENT TRACKING ADJUSTMENT APPARATUS

Referring again to FIG. 7, the roller unit support plate 86 is fixed to an elongated cylindrical shaft 120, threaded along the rear end at 122 for a purpose to be hereinafter described, which is slidably supported in nylon bearing sleeves 124, 126 within an elongated sleeve member 128 having a threaded outer peripheral portion 130 adjustably secured to a fixed mounting plate 132 by adjustment nuts 134, 136. A sleeve member 138, providing a spring well 140, is adjustably mounted on the rear of sleeve member 128 by a nut 142, to which it is welded, and a lock nut 144 threadably mounted on threaded portion 130. A compression spring 146, mounted circumjacent the shaft within the spring well 140, abuts the rear side surface 148 of nut 142 at one end and at the other end abuts the front side surface 150 of a nut assembly 152 which is releasably secured to the threaded portion of the shaft in a manner and for a purpose to be hereinafter described. Thus, the spring 146 provides a resilient biasing force on the shaft and, hence, on the roller units attached thereto as well as the guide elements of the filter belt.

DETENT RELEASE APPARATUS

Referring now to FIGS. 7–10, the split nut assembly 152 comprises a pair of elongated nut elements 154, 156, a cone wedge and abutment element 158, and a retainer ring element 160. As shown in detail in FIGS. 8–10, the nut elements, which are identical, comprise a hexagonal head portion 162, a reduced diameter semi-cylindrical sleeve portion 164, and an abutment flange portion 166. The circumferential length of each element is less than 180° as indicated by slots 168, 170 to enable release of threaded nut portions 172 relative to the threads on the shaft on which the head portions are threadably received as indicated in FIG. 7. In order to further facilitate release of the nut portions, the edges of the threads are beveled at an angle of 30° as indicated at 174, 176 in FIG. 9. In order to further facilitate release from and to facilitate assembly of the split nut elements in threaded engagement with the shaft, the rear end of the sleeve portion is also beveled along the slot at 178, 180. A forwardly facing frusto-conical axial pressure applying surface 182 is provided at the front end of the nut elements by an enlarged counter bore 184. The rear edge of the outer peripheral surface of the head portions is beveled, as indicated at 186, to facilitate axial movement of the retainer ring relative thereto.

Referring again to FIG. 7, the cone wedge and abutment element 158 is provided with a central bore (not shown) of larger diameter than the threaded portion of the shaft so as to be axially slidable relative thereto. A cylindrical surface 187 extending forwardly from abutment surface 150 provides a seat for the rear end of the compression spring. A frusto-conical rearwardly facing abutment surface 188 is received in counter bore 184 and abuttingly wedgingly engages surface 182 of the head portions.

Referring now to FIG. 7, the retainer ring element 160 comprises a hexagonally shaped bore 190 slightly larger than the hexagonal outer periphery of the head portions and having a central annular groove 192 containing a resilient compressible O-ring 194 with an inside diameter slightly less than the distance between opposite edges 196, 198 (FIG. 9) of the head portions so as to be normally frictionally retained thereabout while also being slidable thereover under high stress conditions. Radially extending pins 200, 202 may be provided on the ring element to facilitate manual positioning thereof circumjacent the head portions. An annular abutment plate 204 is welded to the rear side surface of the retainer ring and has a central bore 206 with a diameter less than the aforementioned distance between the opposite edges 196, 198 of the head portions so as to abut the rear side surfaces of the head portions in the assembled position. The diameter of the bore 206 is larger than the outside diameter of the sleeve portions 164 but smaller than the outside diameter of the flange portion 166 so that the rear side surface 208 will abut the front side surface 210 of the flange portions in a rearwardly displaced release position of the ring element (not shown).

In order to automatically release the detent means, provided by the split nut assembly, under severe stress, an elongated cylindrical sleeve 220 is mounted circumjacent sleeve 138 and adjustably fixed thereto by a threaded adjustment fastener 222 which enables the rear end surface 224 to be positioned in predetermined axially spaced relationship to the front surface 226 of the ring element. The surfaces 224, 226 are radially aligned so as to be abuttingly engageable in the event that the roller units, the shaft 120 and the split nut assembly are pulled against the compression spring 146 a predetermined distance under severe stress conditions. If the movement is sufficient, the retainer ring element will be moved rearwardly relative to and off of the head portions 162 onto the sleeve portions 164. The wedge and abutment element will then be effective to disengage the threads on the head portions from the threads on the shaft by a pivotal movement about an area of engagement of the outer periphery of the sleeve portions with the surrounding surface of the bore 206 in plate 204, the pivotal movement being permitted by the beveled portions 178, 180. The forces are such that the release is effected very rapidly and the nut assembly will generally be moved rearwardly along the shaft at high velocity so that it is advisable to provide a threaded retainer nut 230 on the end of the shaft 120 to abuttingly engage the rear surface of flange portion 166 to hold the nut assembly on the shaft.

OPERATION

In operation of the apparatus, the filter belt 12 is mounted around the rotary drum 14, the discharge roll 16, wash roll 18, and return roll 20, or other supporting members, with the guide elements 27, 28 extending between the roller units 70, 72 as shown in FIG. 7. The belt is initially centered relative to the supporting members with the roller units being suitably located relative thereto by adjustment of nuts 134, 136 and suitably spring tensioned by adjustment nuts 142, 144 and split nut assembly 152. The spring tensioning force will be applied to the belt through the inclined abutment surfaces of the roller unit flange 96 and the roller engaging portion 30 of the guide element. The resilient bias provided by compression spring 146 may be provided by other spring means such as a weighted cable as generally disclosed in U.S. Pat. No. 3,077,990. Since the roller units are mounted on parallel shafts 84 extending parallel to the belt and parallel to the main support shaft 120 with upper and lower surfaces of the roller engaging portion confined between parallel roller surfaces 100, the resilient belt centering force exerted on shaft 120 by spring 146 is transmitted through abuttingly engaged surfaces 40 of the guide element and 98 of the roller flange in a direction generally parallel to the belt. The configuration of the roller flange and the roller engaging portion 30 also enables the belt to move past the roller units with a minimum of binding problems. The spacing between rollers 70, 72 may be precisely maintained by adjustably connecting one roller shaft 84 to the plate 86 by a cylindrical support hub portion (not shown) having a central axis eccentric to the central axis of the roller supporting shaft portion so that rotation of the support hub portion in the plate will vary the spacing between the rollers. The arrangement of connection of the cloth to the guide element by stitching extending through two flap portions located on opposite sides of the edge of the cloth is much superior to prior art arrangements involving a single flat portion on only one side of the cloth because the portion of the stitching extending between two flap portions is subject to more or less equal opposing forces applied in shear whereas with only one flap portion that portion of the stitching is in tension and more likely to break or tear out. It is contemplated that the means of fastening the guide element to the cloth may take other forms such as a rivet or adhesive bonding or the like and, in some instances, a reinforcing layer of cloth or plastic material, such as layer 62, may extend completely around the edge of the belt. The apparatus provides an automatic closed loop tracking system by cooperative action of the oppositely aligned tracking assemblies 22, 23. In the event that unusually high stresses are encountered, the apparatus provides an automatic detent-like release system, which will prevent damage to the belt and the alignment apparatus, as hereinbefore described.

Since the inventive concepts may be variously otherwise embodied, it is intended that the appended claims be construed to cover alternative embodiments except as limited by the prior art.

We claim:

1. Filter belt tracking and tensioning apparatus for a movable endless filter belt including a guide element along each edge of the belt extending completely therearound, and comprising:
    opposed gripping and tensioning units mounted adjacent opposite edges of said belt for maintaining the belt under lateral tension and for tracking the belt,
    said units including holding means for holding said guide element laterally while affording ready longitudinal movement of the guide element therethrough, at least one of said units being movable laterally relative to the belt and including spring means associated with and biasing said holding means away from said belt for maintaining tension on said belt, said one of said units further including a release means effective upon excess tension exerted by the belt for disassociating said spring means from said holding means and thereby reducing the lateral tension force on said guide element, said release means comprising a support bar movably supporting and extending laterally in the direction of movement of said holding means including a threaded portion,
    said spring means being a compression spring surrounding said bar,
    a fixed stop member engaging one end of said spring means,
    a split nut having portions releasably mounted on said threaded portion of said bar and being adjustable relative thereto to vary the compression of said spring, and
    a spring-engaging member concentric with said nut and having a wedging portion for urging the split portions of said nut apart upon occurrence of a predetermined excess stress exerted by the belt whereby the portions of said nut are separated and said support bar is slidable relative thereto to relieve lateral tension on said guide element.

2. A filter belt tracking system comprising:
    an endless loop filter belt having a guide element fixed thereto along at least one edge and being movable along an endless filter path,
    said guide element comprising a first flat abutment surface extending generally parallel to the path of movement of said filter belt and a second abutment surface inclined away from said filter belt,
    roller means mounted adjacent the edge of said filter belt and being continuously engageable with said guide element,
    said roller means comprising an inclined side surface cooperatively engaging said second abutment surface,
    movable mounting means for said roller means movable laterally relative to said belt and carrying said roller means thereon,
    spring means associated with said mounting means and biasing said mounting means and said roller means laterally away from said belt and exerting a resilient lateral outward bias on said belt, and
    release means to disassociate said spring means from said mounting means and said roller means when excessive stress occurs between said belt and said roller means,
    said movable mounting means comprising:
        a plate member supporting said roller means,
        a shaft member fixed to said plate member and extending generally parallel to said belt, and
        bracket means slidably supporting said shaft member,
    said spring means comprising:
        a compression spring mounted on said shaft member and abutting said bracket means at one end,
        a threaded portion on said shaft member, and nut means mounted on said threaded portion and abutting the other end of said spring to bias said shaft member away from said belt, and said nut means comprising:

upper and lower nut elements separated by opposite parallel slots, an axially slidable retainer ring movable between a retaining position and a release position relative to said nut elements, and release means fixedly mounted relative to said nut means and said shaft and being engageable with said retainer ring under severe stress to move said retainer ring to the release position to disengage said nut elements from said shaft and disassociate said spring from said roller means.

3. A system for releasably guiding and applying locating forces to an endless movable belt of a filter unit during operation of the filter unit and being releasable to remove such forces during operation of the filter unit whenever there are predetermined high stress conditions in the belt comprising:

a guide element fixed on the edge of the belt and movable therewith, first and second rotatable belt guiding and locating roller elements mounted in fixed relative relationship on opposite sides of said guide element and continuously engaging the opposite sides of said guide element during movement of said belt and controllably resiliently exerting locating forces on said belt under normal operating conditions in a direction extending generally transversely outwardly of the path of movement of said belt, mounting means rotatably mounting said roller means relative to said belt including first and second shaft members mounted in fixed spatial relationship to said roller elements and each providing an axis of rotation for one of said roller elements extending in a plane generally parallel to the direction of application of the locating forces and each being located in a plane extending substantially parallel to said belt, said shaft members being held in fixed relative spatial relationship during operation of said system so as to maintain said roller elements in fixed relative spaced relationship in continuous contact with said guide element during operation of said system, movable bracket means supporting said mounting means and permitting movement of said shaft members and said roller elements parallel to the axis of rotation of said shaft members during operation of said system, spring means controllably associated with said movable bracket means and providing the locating forces applied to said belt through said roller elements and said guide element, and releasable detent means operatively connecting said spring means with said movable bracket means to apply the locating forces to said belt during normal operation of said system and being releasable at a predetermined high stress to disconnect said spring means relative to said movable bracket means whereby said mounting means and said roller elements being movable independent of said spring means in a direction opposite to the direction of application of the locating forces with said roller elements still being in engagement with said guide elements.

4. The invention as defined in claim 3 wherein said belt comprising:

an endless loop filtering cloth and said guide element comprising one piece of solid resilient flexible material fixedly attached to at least one edge of said filtering cloth for engagement with said roller elements, an enlarged roller engaging portion on said guide element, a roller engaging abutment surface on said roller engaging portion, a cloth attaching portion on said guide element including:

a pair of generally parallel flap portions having a cloth slot therebetween, the edge of said cloth being mounted in said slot between flap portions, and fastening means fixedly securing said flap portions and said edge of said cloth to one another, a solid connecting portion betwen said roller engaging portion and said cloth attaching portion, said cloth slot terminating adjacent said solid connecting portion, and roller engaging surface means on said solid connecting portion between said roller engaging portion and said flap portions.

5. The invention as defined in claim 4 and wherein said roller engaging portion extends outwardly beyond the upper surface of said cloth attachment portion, and said roller engaging abutment surface extending outwardly beyond the upper surface of said cloth attachment portion and generally facing toward the cloth.

6. The invention as defined in claim 5 and wherein said roller engaging abutment surface is flat.

7. The invention as defined in claim 5 and wherein said roller engaging abutment surface is curved.

8. The invention as defined in claim 5 and said roller engaging surface means comprising a pair of parallel spaced flat roller engaging abutment surfaces extending generally parallel to said cloth.

9. The invention as defined in claim 5 and said roller engaging portion extending outwardly from the lower surface of said cloth attachment portion and having another roller engaging abutment surface extending outwardly beyond the lower surface of said cloth attachment portion and generally facing toward the cloth.

10. The invention as defined in claim 9 and wherein said roller engaging abutment surface is flat.

11. The invention as defined in claim 9 and wherein said roller engaging abutment surface is curved.

12. The invention as defined in claim 9 and said roller engaging surface means comprising a pair of parallel spaced flat roller engaging abutment surfaces extending generally parallel to said cloth.

13. The invention as defined in claim 3 and wherein said guide element comprising:

a roller engaging abutment surface extending outwardly from said cloth and inclined relative thereto so as to generally face toward the center of the cloth, and at least one of the roller elements having a corresponding abutment surface generally facing away from the center of the cloth and exerting a force on said belt generally parallel thereto.

14. The invention as defined in claim 13 and wherein said guide element further comprising at least one abutment surface extending generally parallel to the belt, at least one of said roller elements having a corresponding abutment surface extending generally parallel to the belt and engaging said one abutment surface on said guide element and confining movement of said guide element between said roller elements to a path generally parallel to said belt.

15. The invention as defined in claim 3 and wherein said movable bracket means comprising:
    a plate member supporting said mounting means and said roller means,
    a third shift member fixed to said plate member and extending generally parallel to said belt, and
    bracket means fixedly mounted relative to and slidably supporting said third shaft member.

16. The invention as defined in claim 15 and wherein said spring means comprising:
    a compression spring mounted on said third shaft member and abutting said bracket means at one end,
    a threaded portion on said third shaft member, and
    nut means releasably mounted on said threaded portion and abutting the other end of said spring to bias said third shaft member away from said belt.

17. The invention as defined in claim 16 and wherein said nut means comprising:
    upper and lower nut elements separated by opposite parallel slots,
    an axially slidable retainer ring movable between a retaining position and a release position relative to said nut elements, and
    release means fixedly mounted relative to said nut means and said third shaft member and being engageable with said retainer ring under severe stress to move said retainer ring to the release position to disengage said nut elements from said third shaft member and disassociate said spring from said roller means.

* * * * *